United States Patent Office 3,055,928
Patented Sept. 25, 1962

3,055,928
ESTERS OF 2-CARBAMOYLBENZENESULFONIC ACIDS
Minerva C. Flores, Philadelphia, and Bernard Loev, Broomall, Pa., assignors to Smith Kline & French Laboratories, Philadelphia, Pa., a corporation of Pennsylvania
No Drawing. Filed Mar. 28, 1960, Ser. No. 17,778
7 Claims. (Cl. 260—456)

This invention relates to new esters of 2-carbamoylbenzenesulfonic acids which have valuable enhanced pharmacodynamic activity.

More specifically, the compounds of this invention are useful as muscle relaxants as well as anticonvulsants, anti-strychnine agents and central nervous system depressants. These compounds are particularly advantageous because they possess a minimum of side effects.

In addition this invention relates to 2-carbamoylbenzenesulfonyl chlorides useful as intermediates in the preparation of the esters of this invention.

The novel alkyl esters and negatively substituted phenyl esters of 2-carbamoylbenzenesulfonic acids are represented by the following fundamental formula:

(Formula I)

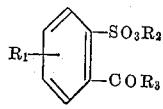

when $R_1$ represents hydrogen, amino, mono-lower alkylamino, di-lower alkylamino, trifluoromethyl, hydroxy, methoxy, nitro, chloro or methyl, preferably in the m- or p-position to the carbamoyl group; $R_2$ represents lower alkyl or a phenyl moiety substituted by a negative moiety as exemplified by the following: halophenyl, such as chlorophenyl, dichlorophenyl, trichlorophenyl, fluorophenyl or bromophenyl, trifluoromethylphenyl or nitrophenyl, preferably in the para position; and $R_3$ represents amino, mono-lower alkylamino, di-lower alkylamino or phenylamino.

Advantageous compounds of this invention are represented by the following structural formula:

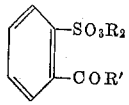

when $R_2$ is halophenyl such as chlorophenyl, dichlorophenyl, trichlorophenyl, fluorophenyl or bromophenyl, trifluoromethylphenyl or nitrophenyl and $R_3$ is as previously defined.

The preferred and advantageous compounds of this invention are represented by the following structural formula:

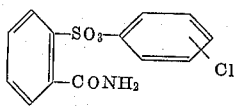

preferably substituted in the para position.

By the term "lower alkyl" where used herein, alkyl groups having 1 to 6 carbon atoms, preferably 1 to 4 carbon atoms, are indicated.

This invention also includes nontoxic, pharmaceutically acceptable, acid addition salts of the above defined compounds when $R_1$ is amino, mono-lower alkylamino or di-lower alkylamino. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with methanesulfonic, ethanedisulfonic and benzenesulfonic acids as well as with the 8-halotheophyllines, for example, 8-chlorotheophylline and 8-bromotheophylline. Exemplary of such inorganic salts are those with hydrochloric, hydrobromic, hydroiodic, sulfuric, sulfamic, phosphoric and nitric acids. Of course, these salts also may be prepared by the classical method of double decomposition of appropriate salts which is well-known to the art.

The compounds of this invention are prepared according to the following procedure:

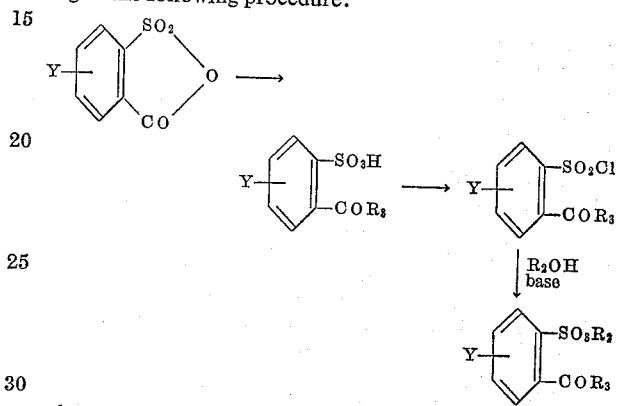

when $R_2$ and $R_3$ are as previously defined and Y is hydrogen, nitro, trifluoromethyl, hydroxy, methoxy, chloro or methyl.

The 2-sulfobenzoic anhydride (or acid) starting material is treated with at least an equimolar amount and, preferably, with an excess of ammonia or a substituted amine in an inert organic solvent such as benzene, toluene, tetrahydrofuran or dimethylformamide. The resulting ammonium salt of a 2-carbamoylbenzenesulfonic acid is reacted with a chlorinating agent, such as phosphorus oxychloride or thionyl chloride in an organic solvent such as benzene or, preferably, dimethylformamide or dimethylacetamide at an elevated temperature such as about 75–100° C. Concentration of the reaction mixture gives, as the residue, a 2-carbamoylbenzenesulfonyl chloride. This sulfonyl chloride is treated with an alkyl alcohol in the presence of an acid binding agent such as a preferred alkali metal alkoxide such as sodium or potassium alkoxide or with a substituted phenol also in the presence of an acid binding agent preferably an alkali metal hydroxide such as sodium or potassium hydroxide. The alcohol or phenol is present in at least an equimolar amount. The reaction mixture is diluted with water and extracted with an organic, water-immiscible solvent such as ether or ethyl acetate to give, after drying and concentrating the extracts, the compounds of this invention, the alkyl and substituted phenyl esters of 2-carbamoylbenzenesulfonic acids.

Alternatively, to prepare the substituted phenyl esters of this invention, the 2-sulfobenzoic anhydride (or acid) is converted to its dichloride by treatment with an excess of chlorinating agent such as phosphorus trichloride, thionyl chloride or, preferably, phosphorus pentachloride.

The reactants are heated at from about 90° C. to the reflux temperature of the reaction mixture for about two to six hours. Concentration of the mixture gives crude 2-chlorosulfonylbenzoyl chloride as the residue. This dichloride is heated with an excess of the appropriately substituted phenol at about 40–55° C. for about 4 to 12 hours. The reaction mixture containing the substituted phenyl ester of 2-chloroformylbenzenesulfonic acid is treated with an excess of ammonia or an alkylamine in an organic solvent such as ether or benzene or, preferably, with an aqueous ammonium hydroxide or alkylamine solution. The reaction mixture is stirred for about 5 to 60 minutes, then worked up, conveniently by concentrating the reaction mixture to give the crude substituted phenyl ester of 2-carbamoylbenzenesulfonic acid which is purified by fractional crystallization from a suitable solvent such as a lower alcohol, for example ethanol or isopropanol, or by chromatography on an alumina column with an organic solvent such as tetrahydrofuran.

When the desired compound has an amino substituent on the benzene ring the following additional procedure may be advantageously followed. The nitro-2-carbamoylbenzenesulfonic acid ester is reduced to the corresponding amino compound either by catalytic hydrogenation or by chemical reduction. Where catalytic hydrogenation is employed, the nitro ester, in an inert organic solvent such as ethyl acete, is reduced using a catalyst such as platinum or palladium oxide, or, preferably, palladium-on-charcoal at about 40 to 60 p.s.i. for about 30 to 60 minutes at room temperature.

With respect to chemical reduction the nitro ester is reacted with a chemical reducing agent, for example, with sodium hydrosulfite in an alkaline solution, such as in a tertiary base, for instance, pyridine.

Mono- and dialkylation of the amino ester is accomplished by refluxing the ester with one or two molar equivalents of a reactive alkyl ester such as the preferred alkyl halide, for example, alkyl chloride, bromide or iodide. Advantageously, the reaction is carried out in an inert organic solvent, such as benzene or dimethylformamide in which at least one of the reactants must be soluble. When a dialkylamino ester is desired, it is advantageous to use an amount of alkyl halide in excess of two molar equivalents.

In certain instances it is convenient to prepare the compounds where $R_1$ is Cl, OH, etc. by diazotization of the corresponding $NH_2$ derivative.

The following examples are not limiting but are illustrative of compounds of this invention and will serve to make fully apparent all of the compounds embraced by the general formula given above.

*Example 1*

A mixture of 61.3 g. of 2-sulfobenzoic anhydride and 104.0 g. of phosphorus pentachloride is heated at 95° C. for 2.5 hours. The resulting solution is concentrated in vacuo and the residue is dissolved in ether. The ethereal solution is washed with water, dried over magnesium sulfate, filtered and concentrated to give, as the residue, 2-chlorosulfonylbenzoyl chloride.

A mixture of 19.4 g. of 2-chlorosulfonylbenzoyl chloride and 20.85 g. of p-chlorophenol is heated at 40–45° C. for five hours. After cooling, 100 ml. of 50% ammonium hydroxide is added and the resulting mixture is stirred for five minutes, then concentrated. The residue is dissolved in ethanol. The ethanol solution is filtered and concentrated to give a residue which is fractionally crystallized from ethanol to give the p-chlorophenyl ester of 2-carbamoylbenzenesulfonic acid, M.P. 159–162° C.

*Example 2*

A mixture of 28.3 g. of 2-chlorosulfonyl-4-nitrobenzoyl chloride and 25.0 g. of p-chlorophenol is heated at 45° C. for five hours. To the cooled reaction mixture is added 150 ml. of 50% ammonium hydroxide solution. The resulting mixture is stirred for five minutes, then concentrated. The residue is dissolved in ethanol and the solution is filtered and concentrated. Fractional crystallization of the residue from ethanol gives the p-chlorophenyl ester of 2-carbamoyl-5-nitrobenzenesulfonic acid.

A solution of 10.0 g. of the above prepared nitro compound in 100 ml. of ethyl acetate is hydrogenated for 40 minutes at room temperature under about 50 pounds of hydrogen pressure using 1.0 g. of 10% palladium-on-charcoal. Filtration, concentration and recrystallization of the residue gives the p-chlorophenyl ester of 5-amino-2-carbamoylbenzenesulfonic acid.

An ether solution of 1.0 g. of the above prepared amino compound is treated with an excess of ethanolic hydrogen chloride. Dilution with ether and filtration gives the hydrochloride salt of 5-amino-2-carbamoylbenzenesulfonic acid, p-chlorophenyl ester.

*Example 3*

A mixture of 3.3 g. of 2-carbamoylbenzenesulfonic acid in 6 ml. of dimethylformamide and 1.8 g. of thionyl chloride is heated at 90–95° C. for 15 minutes. Concentration in vacuo and recrystallization of the residue from ethanol gives 2-carbamoylbenzenesulfonyl chloride.

A solution of 3.55 g. of 2-carbamoylbenzenesulfonyl chloride in isopropanol is treated with 1.3 g. of sodium isopropoxide. The resulting mixture is stirred for 30 minutes, then diluted with water and extracted with ethyl acetate. The extract is dried, filtered and concentrated to give, as the residue, isopropyl 2-carbamoylbenzenesulfonate which is recrystallized from aqueous ethanol.

*Example 4*

A mixture of 21.9 g. of 2-carbamoylbenzenesulfonyl chloride (prepared as in Example 3) and 100 ml. of methanol is treated with 5.4 g. of sodium methoxide and stirred for 30 minutes. Diluting with water, extracting with ether, filtering and concentrating the extract, and recrystallizing the residue from aqueous ethanol gives methyl 2-carbamoylbenzenesulfonate.

*Example 5*

A tetrahydrofuran solution of 4-chloro-2-sulfobenzoic anhydride (prepared by heating the corresponding acid with acetic anhydride and distilling) is saturated with ammonia. The precipitate is filtered off to give the ammonium salt of 2-carbamoyl-5-chlorobenzenesulfonic acid.

A mixture of the above prepared acid (10.0 g.) in 25 ml. of dimethylformamide and 6.0 g. of thionyl chloride is heated on a stream bath for 20 minutes. Concentrating in vacuo and recrystallizing the residue from ethanol gives 2-carbamoyl-5-chlorobenzenesulfonyl chloride.

The above prepared acid chloride (5.0 g.) in 50 ml. of ethanol is treated with 1.4 g. of sodium ethoxide. The resulting mixture is stirred for 30 minutes and worked up as in Example 4 to give the ethyl ester of 2-carbamoyl-5-chlorobenzenesulfonic acid.

*Example 6*

A solution of 10.0 g. of 5-methoxy-2-sulfobenzoic anhydride (prepared by dehydrating the corresponding acid by heating with acetic anhydride) in benzene is saturated with ammonia. The precipitate is the ammonium salt of 2-carbamoyl-4-methoxybenzenesulfonic acid.

The above prepared ammonium salt of the sulfonic acid (9.2 g.), thionyl chloride (6.7 g.) and dimethylformamide (25 ml.) is heated at 90–100° C. for 20 minutes. Working up as in Example 5 gives 2-carbamoyl-4-methoxybenzenesulfonyl chloride. A mixture of this sulfonyl chloride (10.0 g.), t-butanol (100 ml.) and sodium t-butoxide (3.8 g.) is stirred for 30 minutes, then diluted with water and extracted with ethyl acetate. Concentrating the extracts and recrystallizing the residue from ethanol-water furnishes t-butyl 2-carbamoyl-4-methoxybenzenesulfonate.

*Example 7*

Sodium sec-butoxide (1.0 g.) is added to a mixture of 2.2 g. of 2-carbamoylbenzenesulfonyl chloride (made as in Example 3) and 12 ml. of sec-butanol. Stirring for 30 minutes and working up as in Example 6 yields sec-butyl 2-carbamoylbenzenesulfonate.

Example 8

A mixture of 15.0 g. of 4-hydroxy-2-sulfobenzoic anhydride (prepared by dehydrating the corresponding acid) in benzene is saturated with ammonia to separate the ammonium salt of 2-carbamoyl-5-hydroxybenzenesulfonic acid.

This sulfonic acid is converted to the corresponding sulfonyl chloride by heating with thionyl chloride on a steam bath for 15 minutes.

A mixture of 11.7 g. of 2-carbamoyl-5-hydroxybenzenesulfonyl chloride, 12.0 g. of m-bromophenol and 2.8 g. of potassium hydroxide in water is stirred for 30 minutes. Diluting with water, extracting with ethyl acetate and concentrating the extract gives, after recrystallization from ethanol, the m-bromophenyl ester of 2-carbamoyl-5-hydroxybenzenesulfonic acid.

Example 9

A mixture of 22.9 g. of 5-nitro-2-sulfobenzoic anhydride and 41.0 g. of phosphorus pentachloride is heated on a steam bath for 2.5 hours. Working up as in Example 1 gives 2-chlorosulfonyl-5-nitrobenzoyl chloride.

The above prepared benzoyl chloride (14.2 g.) and 12.5 g. of p-chlorophenol are heated at 50° C. for five hours. The cooled reaction mixture is treated with 80 ml. of 50% ammonium hydroxide. The resulting mixture is stirred for five minutes, then concentrated. Recrystallization of the residue from ethanol gives the p-chlorophenyl ester of 2-carbamoyl-4-nitrobenzenesulfonic acid.

Hydrogenation of 10.0 g. of the above prepared nitro compound in ethyl acetate solution at 50 p.s.i. for 35 minutes using 1.0 g. of palladium-on-charcoal catalyst gives, after filtering, concentrating and recrystallizing the residue, the p-chlorophenyl ester of 4-amino-2-carbamoylbenzenesulfonic acid.

This amino compound in ether solution is treated with ethanolic hydrogen chloride. Dilution with ether and filtration gives the hydrochloride salt of p-chlorophenyl 4-amino-2-carbamoylbenzenesulfonate.

Example 10

A mixture of 19.8 g. of 4-methyl-2-sulfobenzoic anhydride and 40.0 g. of phosphorus pentachloride is heated at 90–100° C. for two hours. Concentrating the reaction mixture in vacuo, dissolving the residue in ether, and washing with water, filtering and concentrating the ethereal solution gives, as the residue, 2-chlorosulfonyl-4-methylbenzoyl chloride.

The above prepared benzoyl chloride is heated at 50° C. with 22 g. of p-fluorophenol for five hours. After cooling, 100 ml. of 50% ammonium hydroxide is added and the resulting mixture is stirred for five minutes. Concentrating and recrystallizing the residue from ethanol gives the p-fluorophenyl ester of 2-carbamoyl-5-methylbenzenesulfonic acid.

Example 11

A mixture of 23.8 g. of 2-chlorosulfonylbenzoyl chloride, made as in Example 1, and 30.0 g. of 3,4-dichlorophenol is heated at 45° C. for five hours, then cooled, treated with 100 ml. of 50% ammonium hydroxide and stirred for 10 minutes. Working up as in Example 1 gives the 3,4-dichlorophenyl ester of 2-carbamoylbenzenesulfonic acid.

Example 12

Fifteen grams of 4-nitro-2-chlorosulfonylbenzoyl chloride and 20.0 g. of 3,4,5-trichlorophenol were heated at 50° C. for six hours. To the cooled reaction mixture is added 75 g. of 50% ammonium hydroxide. The mixture is stirred for five minutes, then concentrated and the residue is taken up in ethanol. The solution is filtered and concentrated. The residue is fractionally crystallized from ethanol to give the 3,4,5-trichlorophenyl ester of 2-carbamoyl-5-nitrobenzenesulfonic acid.

This nitro ester (3.0 g.) is dissolved in pyridine and treated with 8.5 g. of sodium hydrosulfite in 25 ml. of water. The mixture is refluxed for two hours with vigorous stirring. The organic layer is diluted with water, extracted with benzene, dried and solvents removed in vacuo to give the 3,4,5-trichlorophenyl ester of 5-amino-2-carbamoylbenzenesulfonic acid.

The above prepared amino compound is dissolved in ethyl acetate and treated with excess methane sulfonic acid to give, upon concentration and cooling, the methane sulfonate salt.

Example 13

Ten grams of 2-chlorosulfonylbenzoyl chloride, prepared as in Example 1, and 15.0 g. of p-trifluoromethylphenol are heated at 45–50° C. for five hours. Treatment of the reaction mixture with excess ammonium hydroxide solution as in Example 12 gives the p-trifluoromethylphenyl ester of 2-carbamoylbenzenesulfonic acid.

Treatment of the free base in ether solution with an excess of alcoholic hydrogen chloride gives the hydrochloride salt.

Example 14 o-Chlorophenol (10.0 g.) and 9.5 g. of 2-chlorosulfonylbenzoyl chloride, made as in Example 1, are heated at 45° C. for six hours. The reaction mixture is cooled, diluted with ether and treated with 60 ml. of 50% ammonium hydroxide solution. The resulting mixture is stirred for 15 minutes, then concentrated in vacuo. Recrystallization of the residue from ethanol gives the o-chlorophenyl ester of 2-carbamoylbenzenesulfonic acid.

Example 15

A mixture of 9.5 g. of 2-chlorosulfonylbenzoyl chloride, made as in Example 1, and 10.0 g. of m-chlorophenol are heated for five hours at 40–45° C. Cooling, dissolving in ether, treating with 3.5 g. of methylamine in aqueous solution, stirring the resulting mixture for 20 minutes, then concentrating and recrystallizing the residue gives the m-chlorophenyl ester of 2-(methylcarbamoyl)benzenesulfonic acid.

Example 16

Five grams of 2-chlorosulfonylbenzoyl chloride (made as in Example 1) and 6.0 g. of p-chlorophenol are heated for five hours at 40–50° C. The cooled mixture is dissolved in ether and treated with 4.0 g. of dimethylamine in ether solution. The resulting mixture is stirred for one hour at room temperature and concentrated in vacuo. Recrystallization of the residue from ethanol gives the p-chlorophenyl ester of 2-(dimethylcarbamoyl)benzenesulfonic acid.

Example 17

A solution of 18.4 g. of 2-sulfobenzoic anhydride in benzene is treated with 20.2 g. of n-hexylamine. Concentrating in vacuo gives the hexylammonium salt of 2-(n-hexylcarbamoyl)benzenesulfonic acid. This sulfonic acid salt is dissolved in dimethylformamide and treated with 12.0 g. of thionyl chloride. The mixture is heated at 90° C. for 20 minutes, then concentrated to give, upon recrystallization of the residue from ethanol, 2-(n-hexylcarbamoyl)benzenesulfonyl chloride.

A mixture of 15.1 g. the above prepared sulfonyl chloride, 4.1 g. of sodium isopropoxide and 75 ml. of isopropanol is stirred for 30 minutes. Diluting with water, extracting with ethyl acetate and concentrating the extract gives isopropyl 2-(n-hexylcarbamoyl)benzenesulfonate.

Example 18

A mixture of 23.8 g. of 2-chlorosulfonylbenzoyl chloride, made as in Example 1, and 30. g. of p-trifluoromethylphenol are heated at 45–50° C. for five hours. The cooled mixture is treated with 9.3 g. of aniline in ether solution. The resulting mixture is stirred for 30 minutes, then concentrated in vacuo. Recrystallization of the residue from ethanol gives the p-trifluoromethylphenyl ester of 2-(phenylcarbamoyl)benzenesulfonic acid.

*Example 19*

A mixture of 3.2 g. of the p-chlorophenyl ester of 4-amino-2-carbamoylbenzenesulfonic acid, prepared as in Example 9, and 1.4 g. of methyliodide in 50 ml. benzene is refluxed for two hours. Removal of the solvent in vacuo and recrystallization of the residue from ethanol gives p-chlorophenyl 4-methylamino-2-carbamoylbenzenesulfonate hydroiodide.

*Example 20*

A mixture of 6.5 g. of p-chlorophenyl 4-amino-2-carbamoylbenzenesulfonate (made as in Example 9) and 8.0 g. methyl iodide in 100 ml. of tetrahydrofuran is heated at reflux for 24 hours. The solution is concentrated. The p-chlorophenyl ester of 4-dimethylamino-2-carbamoylbenzene-sulfonic acid is obtained as its hydroiodide salt by recrystallization of the residue from ethanol.

*Example 21*

A mixture of 3.2 g. of p-chlorophenyl 5-amino-2-carbamoylbenzenesulfonate prepared as in Example 2, and 4.0 g. of n-hexylbromide in 100 ml. of benzene is refluxed for four hours. Evaporation of the solvent and recrystallization of the residue from isopropanol gives p-chlorophenyl 5-dihexylamino-2-carbamoylbenzenesulfonate hydrobromide.

*Example 22*

A mixture of 48.0 g. of α,α,α-trifluoro-p-xylene and 50 ml. of concentrated sulfuric acid is heated with stirring at 100–110° C. for two hours. After cooling, 15 g. of 49% fuming sulfuric acid is added and the resulting mixture is stirred for four hours keeping the temperature below 15° C. The mixture is poured into water to separate 2-methyl-5-trifluoromethylbenzenesulfonic acid.

A solution of 24.0 g. of 2-methyl-5-trifluoromethylbenzenesulfonic acid in 100 ml. of 10% sodium hydroxide and 200 ml. of water is heated on a steam bath while 50 g. of potassium permanganate is added portionwise. When the permanganate has all been decolorized, the manganese dioxide is filtered off. The aqueous filtrate is acidified with hydrochloric acid to precipitate 4-trifluoromethyl-2-sulfobenzoic acid.

The above prepared benzoic acid (27.0 g.) and phosphorus pentachloride (38.0 g.) are heated at 95° C. for two hours. Working up as in Example 1 gives 2-chlorosulfonyl-4-trifluoromethylbenzoyl chloride.

The above prepared benzoyl chloride and 20 g. of p-chlorophenol are heated at 50° C. for five hours. Ammonium hydroxide (100 ml. of a 50% aqueous solution) is added and the resulting mixture is stirred for five minutes. Concentrating the reaction mixture and recrystallizing the residue from ethanol gives p-chlorophenyl 2-carbamoyl-5-trifluoromethylbenzenesulfonate.

*Example 23*

A mixture of 23.8 g. of 2-chlorosulfonylbenzoyl chloride and 20.0 g. of p-nitrophenol is heated at 45° C. for five hours. Cooling, treating with 150 ml. of 50% ammonium hydroxide, stirring for five minutes, concentrating and recrystallizing the residue from ethanol gives p-nitrophenyl-2-carbamoylbenzenesulfonate.

What is claimed is:
1. A chemical compound having the following formula:

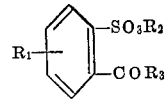

in which $R_1$ is a member selected from the group consisting of hydrogen, amino, mono-lower alkylamino, di-lower alkylamino, trifluoromethyl, hydroxy, methoxy, nitro, chloro and methyl; $R_2$ is a member selected from the group consisting of lower alkyl, monochlorophenyl, dichlorophenyl, trichlorophenyl, monofluorophenyl and monobromophenyl, monotrifluoromethylphenyl and monitrophenyl; and $R_3$ is a member selected from the group consisting of amino, mono-lower alkylamino, di-lower alkylamino and phenylamino; $R_1$ being in a position selected from the group consisting of meta and para to the carbamoyl group.

2. A chemical compound having the following formula:

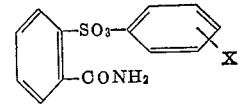

in which X is halo.

3. A chemical compound having the following formula:

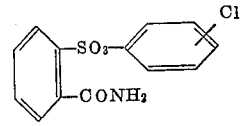

4. A chemical compound having the following formula:

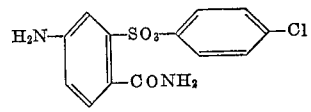

5. A chemical compound having the following formula:

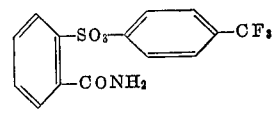

6. A chemical compound having the following formula:

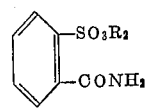

in which $R_2$ is lower alkyl.

7. A chemical compound having the following formula:

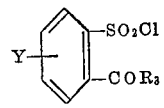

in which Y is a member selected from the group consisting of hydrogen, nitro, trifluoromethyl, hydroxy, methoxy, chloro and methyl; and $R_3$ is a member selected from the group consisting of amino, mono-lower alkylamino, di-lower alkylamino and phenylamino; Y being in a position selected from the group consisting of meta and para to the carbamoyl group.

References Cited in the file of this patent

UNITED STATES PATENTS 1,850,526    Zitscher _____ Mar. 22, 1932

OTHER REFERENCES

Nakaseko: American Chemical Jour. 47 (429–53), 1912.